United States Patent Office 2,900,917
Patented Aug. 25, 1959

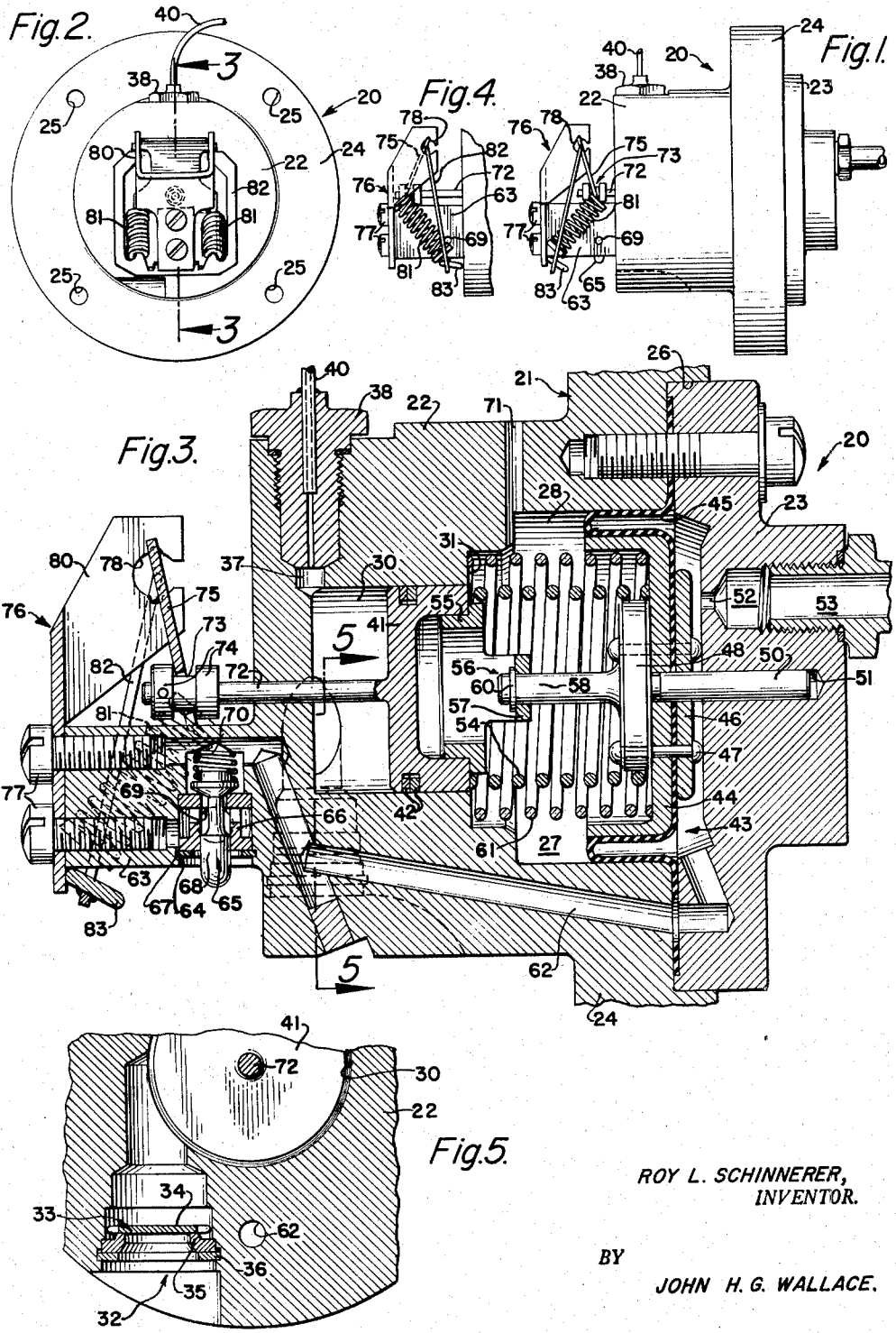

2,900,917
PNEUMATIC OIL PUMPING DEVICE

Roy L. Schinnerer, Long Beach, Calif., assignor to The Garrett Corporation, Los Angeles, Calif., a corporation of California Application May 22, 1956, Serial No. 586,599

10 Claims. (Cl. 103—47)

This invention relates generally to pumping apparatus and is more particularly directed to a lubricant pump suitable for use in a variety of installations, but which is especially adaptable for application to air driven turbomachinery to apply lubricant to anti-friction bearings employed therein.

An object of this invention is to provide an apparatus for utilizing air pressure to apply small quantities of lubricant under pressure to machine or other parts to be lubricated, the apparatus being designed to subject a body of fluid lubricant in a confined space to sustained pressure to effect a prolonged flow of the lubricant to the machine parts and then interrupt the application of pressure when the space is almost emptied of lubricant and create a negative pressure in the space to refill it with lubricant from a suitable source for a succeeding operation.

Another object of the invention is to provide a pumping apparatus having means responsive to pressure of a motivating fluid, such as air, to subject a body of lubricating fluid in a confined space to pressure to effect controlled flow of the lubricating fluid to one or more points of use, the apparatus being so designed that the fluid body will be subjected to pressure of the same magnitude irrespective of variations in the pressure of the motivating fluid between a predetermined minimum and a maximum limited only by the resistance to rupture or breakage of the parts of the apparatus.

Another object of the invention is to provide a pumping apparatus having a fluid receiving cylinder and a piston and means responsive to fluid pressure for imparting a yieldable force to the piston to urge it in a direction to discharge the fluid from the cylinder, suitable means governed by the position of the piston in the cylinder being provided to control the operation of the fluid pressure responsive means, the apparatus providing for lubricant feeding periods of a time duration determined only by the volume of the cylinder and the rate of fluid flow therefrom.

Still another object of the invention is to provide a pumping apparatus having a fluid receiving cylinder and a piston for movement therein to effect the intake and exhaust of fluid, the apparatus also having a fluid pressure operated motor of the reciprocating type and a motion transmitting connection which will receive and store energy supplied thereto by the motor and impart such energy to the piston at a rate controlled by the discharge of fluid from the cylinder, a valve being provided to control the operation of the fluid motor in accordance with the action of the piston.

A further object of the invention is to provide a pumping apparatus of the type mentioned in the preceding paragraph, in which the fluid pressure operated motor comprises a piston-like element to be moved by air pressure in one direction to load a spring the expansion of which causes the pump piston to move in a fluid discharging direction, a lost-motion connection being provided between the piston-like element of the motor and the pump piston to permit full travel of the former in a direction to load the spring while the fluid discharging movement of the pump piston is performed at a retarded rate, the lost-motion connection serving, upon reverse movement of the motor piston element, to move the pump piston in its intake stroke.

Another object of the invention is to provide a pumping apparatus of the type mentioned in the preceding paragraphs in which resilient means tends to move the motor piston in one direction to cause the intake stroke of the pump piston and air pressure moves it against the force of the resilient means to cause the pump piston to move in the discharge stroke, a valve being disposed to control the application of air pressure to the motor piston and actuated by the pump piston adjacent the termination of the intake and discharge strokes.

Other objects and advantages of the invention will appear from the following description of one embodiment of the invention which has been illustrated in detail in the accompanying drawing.

In the drawing, Figure 1 is a side elevational view of a pneumatic oil pumping device formed in accordance with the present invention;

Figure 2 is an end elevational view of the device shown in Fig. 1;

Fig. 3 is a vertical longitudinal sectional view taken through the pneumatic oil pumping device on the plane indicated by the line 3—3 of Fig. 2, a valve actuating member being shown in one position of operation;

Figure 4 is a fragmentary side elevational view illustrating the valve actuating member in another position of operation; and Figure 5 is a detailed vertical transverse sectional view taken on the plane indicated by the line 5—5 of Fig. 3.

Referring more particularly to the drawing, the numeral 20 designates the pneumatic oil pumping device in its entirety. This device includes a casing 21 having a body section 22 and a cap 23. The body section, as illustrated in Fig. 2, is of generally cylindrical form and is provided at one end with a flange 24 in which openings 25 are provided to receive fastening elements employed to mount the pump on a suitable support. The cover 23 is disposed in a counterbored section 26 formed in one end of the body 22 and serves to close a chamber 27 formed in the body. The chamber 27 has a plurality of portions of different cross-sectional areas, one portion designated by the numeral 28, constituting a motor chamber, and another portion designated by the numeral 30, constituting a pump chamber. Between these chambers the body is provided with a shoulder 31, the purpose of which will be apparent from the following description.

The body is provided, as illustrated in Fig. 5, with an inlet port 32 communicating with the pump chamber 30, at the end thereof, opposite the motor chamber, this port 32 receiving a check valve 33 to permit fluid flow into the chamber and prevent flow from the chamber through such port. This check valve includes a flat disklike element 34 having notched edges, the element being disposed to engage a valve seat insert 35 which is held in the port by a snap ring 36. The body 22 is also provided with an outlet port 37 which communicates with the same end of the pump chamber as the inlet port, the port 37 receiving a fitting 38 having a capillary tube 40 extending therefrom to the bearing or other machine part to be lubricated.

Pump chamber 30 receives a piston 41 for reciprocation therein in intake and discharge strokes, the piston being, in this instance, a substantially hollow cylindrical member having suitable sealing rings 42 secured in a groove formed in the piston side wall to prevent fluid flow past the piston. When the piston moves outwardly in the pump chamber, fluid will flow into the chamber through the inlet port 32 due to the reduced pressure created in the pump chamber. When the piston is moved in the opposite direction, check valve 33 will close causing the fluid to be trapped in the pump chamber and subjected to pressure. This pressure will cause the fluid to flow through the capillary tube 40 to the point of use. Because of the reduced capacity of the capillary tube, fluid flow from the pump chamber will be at a controlled rate. During the intake stroke of the pump piston, the fluid will flow through the intake port due to the greater capacity of such port relative to the capillary tube 40.

To effect the operation of the piston 41 the motor chamber 28 is provided with a piston-like element 43 including a flanged disk 44 and a diaphragm 45, the peripheral edge of the latter being clamped between body 22 and the cap 23 when these elements are assembled. The central portion of the diaphragm 45 is secured to the member 44 by a plate 46 and rivets or other fastening devices 47, these elements also securing a flange 48, formed intermediate the length of a guide pin 50, to the plate 44. One end of the guide pin 50 is disposed for sliding movement in a recess 51 formed in the cover 23. The cover is also provided with a restricted fluid inlet port 52 for communication with a conductor 53 leading from a suitable source of fluid, such as air, under pressure. When air, or other fluid under pressure, flows through the inlet port 52, it will engage the diaphragm 45 and exert a force thereon tending to move the motor piston 43 into the motor chamber 28.

It is an object of this invention to transmit force, imparted to the motor piston, to the pump piston 41 in such a manner that the pump piston will always exert the same pressure on the fluid in the pump chamber for the period of time required to effect the flow of the fluid from the pump chamber, such period of time being variable due to the capacity of the pump chamber, the size of the outlet and the viscosity of the fluid. To accomplish this object a coil spring 54 is disposed between the disk 44 and the pump piston 41. The flange 48 on the guide rod 50 centers the spring 54 on the disk 44, the opposite end of the spring being centered on the piston 41 by an open plug 55 secured to the back of the piston. This open plug forms a part of a lost-motion connection 56 provided between the motor piston 44 and the pump piston 41. This lost-motion connection includes a strap 57 forming a part of the plug 55 and one end 58 of the guide rod 50. The end 58 is received for sliding movement in the strap 57 and when the piston 44 moves under the influence of fluid pressure introduced through the port 52, the end 58 of the guide rod slides through the opening in the strap 57, thus permitting the motor piston to complete its movement even though the pump piston moves only slightly or not at all. The difference in movement between the pump and motor pistons serves to compress and load the spring 54 so that it will continue to exert force on the pump piston to move it in a discharge stroke after the motor piston has completed its travel in one direction. One of the features of the invention is the use of the spring to cause the pump piston to apply pressure to the lubricating fluid. It will be apparent that regardless of variations, above a predetermined minimum, in fluid pressure applied to the diaphragm 45, the same operating force will always be applied to the pump piston and consequently to the lubricating fluid in the pump cylinder. This feature makes the apparatus particularly desirable for use on turbomachinery where air pressure may fluctuate widely.

The end 58 of guide rod 50 has a ring 60 secured thereto to engage the strap 57 and cause the pump piston to move in its intake stroke when the motor piston is retracted to a starting position. To effect such movement of the motor piston, a second coil spring 61 is disposed in the motor chamber 28 between the shoulder 31 and the disk 44 of the motor piston. This spring is also compressed when the motor piston is moved by fluid pressure introduced through the inlet 52. The expansion of this spring when the fluid pressure on the motor piston is relieved effects the retraction of the motor piston and the intake stroke of the pump piston.

To relieve the motor piston of fluid pressure, an outlet, or exhaust passage 62, is formed in the cover 23 and body 22, such exhaust passage having a flow capacity exceeding that of the restricted air inlet port 52. This outlet passage extends through the body 22 and into a projection 63 formed on the forward end of the body 22. This projection has a plurality of drilled holes formed therein, one of the holes 64 being provided to receive a spring pressed outlet valve 65. Valve 65 includes a seat insert 66 which is held in the drilled hole 64 by a snap ring 67, and a valve element 68 of the poppet type. As shown in Fig. 1, the passage 62 at the outlet side of the seat for valve 68 communicates with the atmosphere through openings 69 drilled into the sides of projection 63. The element 68 is urged toward the seat on the insert by a coil spring 70 and serves when engaged with the seat, to close the outlet passage 62. When the valve is moved away from the seat in opposition to the spring 70 the exhaust passage 62 will be opened and fluid may then flow from the motor chamber at the inlet side of diaphragm 45 to relieve the diaphragm of fluid pressure and permit spring 61 to return the motor piston to initial or starting position. The motor chamber 28 at the side of the diaphragm containing spring 61 communicates with the atmosphere through a drilled hole 71. This drilled hole permits movement of the pump and motor pistons toward one another without causing air or other fluid to be compressed therebetween or oppose such movement.

The outlet valve 65 is moved to open position by the pump piston 41 when the latter approaches the end of its discharge stroke. To effect this operation a rod 72 projects from the pump through the end wall of the body 22. This rod is provided with a ferrule 73 forming spaced shoulders 74 for engagement with the trigger plate 75 of a snap acting valve actuator mechanism 76, this mechanism being secured to the outer end of the projection 63 by screws 77. The valve actuator mechanism includes the trigger plate 75 which has one end fulcrumed at one side of an opening 78 in a bracket 80 forming part of the actuator mechanism. The other end of the trigger is disposed in engagement with corresponding ends of a pair of springs 81, the opposite ends of the springs being pivoted on the bottom crossbar of a U-shaped lever 82 which has the spaced ends thereof disposed in pivotal engagement with the opposite side wall of the opening 78. The U-shaped lever 82 has a cam plate 83 secured to the bottom crossbar, this cam plate engaging the lower end of the stem of valve 68 when the lever is moved into the position shown in Fig. 4. Lever 82 is moved into this position immediately prior to the termination of the discharge stroke of the pump piston when the ferrule 73 swings the trigger 75 outwardly away from the body 22 and causes the springs to flip the lever 82 into engagement with the valve stem and cause upward movement thereof. When the valve is moved upwardly in this manner the outlet passage 62 leading from the motor chamber will be opened and fluid pressure will be vented from the inlet side of the motor piston. At this time spring 61 will expand and move the motor piston to its initial, or starting position, as previously described. Also, as previously described, this movement will retract the pump piston and cause another charge of fluid to be drawn into the pump chamber. Just before the pump piston reaches its fully retracted position, the ferrule 73 will swing the trigger 75 back toward the body 22 causing the springs 81 to swing the actuating lever 82 in the opposite direction and away from the outlet valve 65. When this operation takes place, spring 70 will move the outlet valve to a closed position and fluid pressure will again be applied to the motor piston 44 to initiate a new cycle of operation of the apparatus. It is obvious that a suitable conductor may lead to the inlet port 32 from a source of lubricant, or other fluid to be pumped by the apparatus, or the entire device may be submerged in a sump or reservoir containing the fluid.

The operation of the apparatus should be clear from the foregoing description, however, a brief summary of such operation is as follows:

Fluid such as air pressure is introduced to the device through a conduit 53 and the restricted inlet port 52. This fluid is applied to the inlet side of the diaphragm 45 causing the motor piston, of which the diaphragm is a part, to move toward the left, as viewed in Fig. 3, into the motor chamber 28. This movement compresses spring 54, storing energy therein which tends to move the pump piston 41 also toward the left and into the pump chamber 30. The force of spring 54 is applied through the piston 41 to fluid in the pump chamber 30, causing this fluid to flow, at a rate determined by the capacity of capillary tube 40, to a point of use. As the piston 41 moves, the trigger 75 is also moved and when the piston nears the end of its discharge stroke, the trigger 75 swings the upper ends of a pair of springs 81 through a plane extending through the lower ends of the springs and the axis of swinging movement of a lever 82. The tendency of the springs 81 to expand causes the lever 82 to rock and engage the lower end of the valve 65, moving this valve upwardly to an open position in which the inlet side of the motor chamber is vented to the atmosphere through the outlet passage 62. Since the capacity of the passage 62 exceeds that of the inlet 52 the piston of the motor is thus relieved of pressure and the motor piston is returned to its starting position by the spring 61. As the motor piston moves in this direction, the lost-motion connection, formed by the end 58 of rod 50 and strap 57 on piston 41, causes the pump piston to be retracted and to draw another charge of fluid into the piston chamber. Near the termination of this movement the valve actuating mechanism is again operated to permit the outlet valve 65 to close causing fluid pressure to again be applied to the motor piston.

It is obvious that many minor changes may be made in the construction and relation of parts without departing from the spirit and scope of the invention.

I claim:

1. Fluid pumping apparatus comprising a casing defining a pump chamber with inlet and outlet ports; wall forming means disposed in said chamber for movement in intake and discharge strokes; fluid pressure responsive means having a power stroke and a return stroke; yieldable means coupling said fluid pressure responsive means to impart a yieldable force to said wall forming means during at least a portion of the power stroke to move it in said discharge stroke and provide for relative movement between said fluid pressure responsive means and said wall forming means; and valve means having a connection with and actuated by said wall forming means at predetermined stages of movement thereof to control the operation of said fluid pressure responsive means.

2. Fluid pumping apparatus comprising a casing defining a pump chamber with inlet and outlet ports; wall forming means disposed in said chamber for movement in intake and discharge strokes; fluid pressure responsive means in said casing; resilient means operatively disposed between said wall forming means and said fluid pressure responsive means to provide for relative movement therebetween and to impart a yieldable force from the latter to the former to move it in said discharge stroke; and valve means having a connection with and actuated by said wall forming means at predetermined stages of movement thereof to control the operation of said fluid pressure responsive means.

3. Fluid pumping apparatus comprising a casing defining a pump chamber with inlet and outlet ports; wall forming means disposed in said chamber for movement in intake and discharge strokes; fluid pressure responsive means in said casing; yieldable means operatively disposed between said wall forming means and said fluid pressure responsive means to impart a yieldable force from the latter to the former to move it in said discharge stroke; additional means establishing a lost-motion connection between said fluid pressure responsive means and said wall forming means, said connection being operative to transmit force from the former to the latter to move it in said intake stroke; and valve means having a connection with and actuated by said wall forming means at predetermined stages of movement thereof to control the operation of said fluid pressure responsive means.

4. Fluid pumping apparatus comprising a casing defining a plurality of chambers, each of said chambers having inlet and outlet ports; means providing a wall in each of said chambers, said walls being movable relative to said casing and to one another; a first resilient means tending to move said walls in opposite directions; a second resilient means between said casing and one of said walls tending to move said one wall in a predetermined direction, fluid pressure applied to said one wall serving to move such wall in the opposite direction against the influence of said second resilient means, such movement serving to increase the tendency of said first resilient means to move said walls in opposite directions; and valve means having a connection with and operated by the other of said walls at predetermined points in the movement thereof to control the application of fluid pressure to said one wall.

5. Fluid pumping apparatus comprising a casing defining pump and motor chambers, each of said chambers having inlet and outlet ports; wall means provided in each chamber for reciprocation relative to said casing and to each other; a first means yieldably urging the wall means in said motor chamber in a predetermined direction, fluid pressure applied to said motor chamber wall means serving to move the same in the opposite direction; a second means between said wall means for receiving energy from said motor chamber wall means when the latter is moved in said opposite direction and transmitting such energy to the pump chamber wall means; motion transmitting means operative when said motor chamber wall means moves in said predetermined direction to impart similar motion to said pump chamber wall means, reciprocation of the latter serving to draw fluid through said pump chamber inlet and expel it through the pump chamber outlet; and valve means operated by said pump chamber wall at predetermined points of travel to control the application of fluid pressure to said motor chamber wall.

6. Fluid pumping apparatus comprising a casing defining pump and motor chambers, each of said chambers having an inlet and an outlet; piston means disposed in each chamber for reciprocation relative to said casing and each other, reciprocation of said pump piston serving to draw fluid through the pump chamber inlet and expel it through the outlet; valve means actuated by said pump piston adjacent the termination of movement in a first direction to apply fluid pressure to said motor piston to effect movement thereof in one direction; means for receiving and storing energy from said motor piston during movement thereof in said one direction, said means imparting such energy to said pump piston to effect movement thereof in a second direction, said pump piston actuating said valve means adjacent the termination of movement in said second direction to interrupt the application of fluid pressure to said motor piston; and means operatively connected with said motor piston to cause said motor piston to move in the opposite direction and said pump piston to move in said first direction.

7. Fluid pumping apparatus comprising a casing defining pump and motor chambers, each of said chambers having inlet and outlet ports; piston means disposed for reciprocation in said pump chamber in fluid intake and discharge strokes; actuator means in said motor chamber responsive to fluid pressure supplied through the motor chamber inlet to move in a predetermined direction; means responsive to the movement of said actuator means in said predetermined direction to transmit a yieldable force to said piston means to move the same in a fluid discharge stroke; valve means actuated by said piston adjacent the termination of a fluid discharge stroke to relieve said actuator means from fluid pressure; means operative upon relief of said actuator means from fluid pressure to move said actuator means in a direction opposed to said predetermined direction; and means operative upon movement of said actuator means in said opposed direction to move said piston means in an intake stroke, said valve means being actuated by said piston means adjacent the termination of an intake stroke to cause the application of fluid pressure to said actuator.

8. Fluid pumping apparatus comprising a casing defining pump and motor chambers, each of said chambers having inlet and outlet ports; piston means disposed for reciprocation in said pump chamber in fluid intake and discharge strokes; actuator means in said motor chamber responsive to fluid pressure supplied through the motor chamber inlet to move in a predetermined direction; spring means responsive to the movement of said actuator means in said predetermined direction to transmit a yieldable force to said piston means to move the same in a fluid discharge stroke; valve means actuated by said piston adjacent the termination of a fluid discharge stroke to relieve said actuator means of fluid pressure; means operative upon relief of said actuator means from fluid pressure to move said actuator means in a direction opposed to said predetermined direction; and means operative upon movement of said actuator means in said opposed direction to move said piston means in an intake stroke, said valve means being actuated by said piston means during the intake stroke to cause the application of fluid pressure to said actuator.

9. Fluid pumping apparatus comprising a casing defining pump and motor chambers, each of said chambers having inlet and outlet ports; piston means disposed for reciprocation in said pump chamber in fluid intake and discharge strokes; actuator means in said motor chamber responsive to fluid pressure supplied through the motor chamber inlet to move in a predetermined direction; spring means responsive to the movement of said actuator means in said predetermined direction to transmit a yieldable force to said piston means to move the same in a fluid discharge stroke; valve means actuated by said piston adjacent the termination of a fluid discharge stroke to relieve said actuator means of fluid pressure; spring means operative upon relief of said actuator means from fluid pressure to move said actuator means in a direction opposed to said predetermined direction; and means operative upon movement of said actuator means in said opposed direction to move said piston means in an intake stroke, said valve means being actuated by said piston means during the intake stroke to cause the application of fluid pressure to said actuator.

10. Fluid pumping apparatus comprising a casing defining pump and motor chambers, each of said chambers having inlet and outlet ports; piston means disposed for reciprocation in said pump chamber in fluid intake and discharge strokes; actuator means in said motor chamber responsive to fluid pressure supplied through the motor chamber inlet to move in a predetermined direction; means responsive to the movement of said actuator means in said predetermined direction to the same in a fluid discharge stroke; valve means actuated by said piston adjacent the termination of a fluid discharge stroke to relieve said actuator means of fluid pressure; spring means operative upon relief of said actuator means from fluid pressure to move said actuator means in a direction opposed to said predetermined direction; and means operative upon movement of said actuator means in said opposed direction to move said piston means in an intake stroke, said valve means being actuated by said piston means during the intake stroke to cause the application of fluid pressure to said actuator.

References Cited in the file of this patent

UNITED STATES PATENTS

| 1,621,933 | Jones | Mar. 22, 1927 |
| 2,163,436 | Raymond et al. | June 20, 1939 |
| 2,658,485 | Dreyer | Nov. 10, 1953 |

FOREIGN PATENTS

| 412,858 | Great Britain | July 5, 1934 |
| 982,422 | France | June 11, 1951 |

UNITED STATES PATENT OFFICE
CERTIFICATE OF CORRECTION

Patent No. 2,900,917                                                                 August 25, 1959

Roy L. Schinnerer

It is hereby certified that error appears in the printed specification of the above numbered patent requiring correction and that the said Letters Patent should read as corrected below.

Column 8, line 25, after "direction to" insert -- transmit a yieldable force to said piston means to move --.

Signed and sealed this 29th day of March 1960.

(SEAL)
Attest:

KARL H. AXLINE                                                  ROBERT C. WATSON
Attesting Officer                                              Commissioner of Patents